(12) United States Patent
Chang et al.

(10) Patent No.: US 12,536,663 B2
(45) Date of Patent: Jan. 27, 2026

(54) ANTIAGING ASSESSMENT METHOD AND DEVICE FOR FACIAL REJUVENATION

(71) Applicants: Chang-Cheng Chang, Taichung (TW); MYGUARD CO., LTD., Taichung (TW)

(72) Inventors: Chang-Cheng Chang, Taichung (TW); Shih-Yueh Hsu, Taoyuan (TW)

(73) Assignees: Chang-Cheng Chang, Taichung (TW); MYGUARD CO., LTD., Taoyuan (TW)

( * ) Notice: Subject to any disclaimer, the term of this patent is extended or adjusted under 35 U.S.C. 154(b) by 431 days.

(21) Appl. No.: 18/210,813

(22) Filed: Jun. 16, 2023

(65) Prior Publication Data

US 2023/0410310 A1    Dec. 21, 2023

Related U.S. Application Data

(60) Provisional application No. 63/352,769, filed on Jun. 16, 2022.

(51) Int. Cl.
| | |
|---|---|
| *G06T 7/00* | (2017.01) |
| *A61B 5/107* | (2006.01) |
| *G06T 7/60* | (2017.01) |
| *G06V 10/75* | (2022.01) |
| *G06V 40/16* | (2022.01) |
| *G16H 20/10* | (2018.01) |

(52) U.S. Cl.
CPC .......... *G06T 7/0016* (2013.01); *A61B 5/1072* (2013.01); *G06T 7/60* (2013.01); *G06V 10/751* (2022.01); *G06V 40/171* (2022.01); *G16H 20/10* (2018.01); *G06T 2207/20081* (2013.01); *G06T 2207/30004* (2013.01); *G06T 2207/30201* (2013.01)

(58) Field of Classification Search
CPC ........ G06V 40/168–179; A61B 5/1072; G06T 7/60
See application file for complete search history.

(56) References Cited

U.S. PATENT DOCUMENTS

| | | | |
|---|---|---|---|
| 2020/0146615 A1* | 5/2020 | De Maio Domingos | ................... G16H 20/40 |
| 2022/0051428 A1* | 2/2022 | Fialkov | ................. A61B 5/742 |
| 2022/0222814 A1* | 7/2022 | Amiri Kamalabad | .. G06T 7/246 |

FOREIGN PATENT DOCUMENTS

CN    110326034 A    10/2019

OTHER PUBLICATIONS

Taiwan Intellectual Property Office search report.

\* cited by examiner

*Primary Examiner* — Raphael Schwartz
(74) *Attorney, Agent, or Firm* — WPAT, PC

(57) ABSTRACT

An antiaging assessment method for facial rejuvenation is provided. Firstly, a spatial relationship between various facial key points of an under-test facial image are precisely described. Consequently, a facial feature is obtained. The spatial relationship is an angle relationship or a length relationship. Then, a feature change comparison between the facial feature and reference feature is performed. Consequently, a feature change value is obtained. According to the at least one feature change value, a facial rejuvenation score index is acquired from a corresponding feature change value range of a facial rejuvenation score index data table. The present invention also provides an antiaging assessment device for facial rejuvenation.

18 Claims, 13 Drawing Sheets

| <-10.00° | -7.79°~-10.00° | -5.57°~-7.78° | -3.34°~-5.56° | -1.12°~-3.33° | -1.11°~+1.11° | 1.12°~3.33° | 3.34°~5.56° | 5.57°~7.78° | 7.79°~10.00° | >10° |
|---|---|---|---|---|---|---|---|---|---|---|
| 0 | 1 | 2 | 3 | 4 | 5 | 6 | 7 | 8 | 9 | 10 |

↑ Δα
↑ ΔαS

| Δβ | <-10.00° | -7.79°~-10.00° | -5.57°~-7.78° | -3.34°~-5.56° | -1.12°~-3.33° | -1.11°~+1.11° | 1.12°~3.33° | 3.34°~5.56° | 5.57°~7.78° | 7.79°~10.00° | >10° |
|---|---|---|---|---|---|---|---|---|---|---|---|
| ΔβS | 0 | 1 | 2 | 3 | 4 | 5 | 6 | 7 | 8 | 9 | 10 |

Fig. 2C

| >10° | 7.79°~10.00° | 5.57°~7.78° | 3.34°~5.56° | 1.12°~3.33° | -1.11°~+1.11° | -1.12°~-3.33° | -3.34°~-5.56° | -5.57°~-7.78° | -7.79°~-10.00° | <-10.00° |
|---|---|---|---|---|---|---|---|---|---|---|
| 0 | 1 | 2 | 3 | 4 | 5 | 6 | 7 | 8 | 9 | 10 |

↑ Δγ  ↑ ΔγS

| $\Delta\delta$ | <-10.00° | -7.79° ~-10.00° | -5.57° ~-7.78° | -3.34° ~-5.56° | -1.12° ~-3.33° | -1.11° ~+1.11° | 1.12° ~3.33° | 3.34° ~5.56° | 5.57° ~7.78° | 7.79° ~10.00° | >10° |
|---|---|---|---|---|---|---|---|---|---|---|---|
| $\Delta\delta S$ | 0 | 1 | 2 | 3 | 4 | 5 | 6 | 7 | 8 | 9 | 10 |

Fig. 3C

| <-3mm | -2.34~-3.00mm | -1.68~-2.33mm | -1.01~-1.67mm | -0.34~-1.00mm | -0.33~+3.33mm | 0.34~1.00mm | 1.01~1.67mm | 1.68~2.33mm | 2.34~3.00mm | >3mm |
|---|---|---|---|---|---|---|---|---|---|---|
| 0 | 1 | 2 | 3 | 4 | 5 | 6 | 7 | 8 | 9 | 10 |

↑ Δa
↑ ΔaS

| >3mm | 2.34~3.00mm | 1.68~2.33mm | 1.01~1.67mm | 0.34~1.00mm | -0.33~+0.33mm | -0.34~-1.00mm | -1.01~-1.67mm | -1.68~-2.33mm | -2.34~-3.00mm | <-3mm |
|---|---|---|---|---|---|---|---|---|---|---|
| 0 | 1 | 2 | 3 | 4 | 5 | 6 | 7 | 8 | 9 | 10 |

← Δb
← ΔbS

| Δc | <-3mm | -2.34~-3.00mm | -1.68~-2.33mm | -1.01~-1.67mm | -0.34~-1.00mm | -0.33~+3.33mm | 0.34~1.00mm | 1.01~1.67mm | 1.68~2.33mm | 2.34~3.00mm | >3mm |
|---|---|---|---|---|---|---|---|---|---|---|---|
| ΔcS | 0 | 1 | 2 | 3 | 4 | 5 | 6 | 7 | 8 | 9 | 10 |

Fig. 5C

| Δd | >3mm | 2.34~3.00mm | 1.68~2.33mm | 1.01~1.67mm | 0.34~1.00mm | -0.33~+0.33mm | -0.34~-1.00mm | -1.01~-1.67mm | -1.68~-2.33mm | -2.34~-3.00mm | <-3mm |
|---|---|---|---|---|---|---|---|---|---|---|---|
| ΔdS | 0 | 1 | 2 | 3 | 4 | 5 | 6 | 7 | 8 | 9 | 10 |

| >10mm | 7.79~10.00mm | 5.57~7.78 mm | 3.34~5.56 mm | 1.12~3.33 mm | -1.11~+1.11 mm | -1.12~-3.3 mm | -3.34~-5.56 mm | -5.57~-7.78 mm | -7.79~-10.00mm | <-10.00mm | Δe |
|---|---|---|---|---|---|---|---|---|---|---|---|
| 0 | 1 | 2 | 3 | 4 | 5 | 6 | 7 | 8 | 9 | 10 | ΔeS |

ANTIAGING ASSESSMENT METHOD AND DEVICE FOR FACIAL REJUVENATION

FIELD OF THE INVENTION

The present invention relates to an assessment method and an assessment device for facial rejuvenation, and more particularly to an antiaging assessment method and an antiaging assessment device for facial rejuvenation.

BACKGROUND OF THE INVENTION

Nowadays, the assessment of the aesthetic medicine effect is only made through the simple judgment by the professional doctors according to their personal practice experience and the general photographing results. However, this method of purely manual comparison and observation is not reliable and unable to provide quantitative data for verification. In other words, this method is far from achieving the purpose of accurately and effectively evaluating the difference between each patient before and after treatment. In addition, this method is prone to generate unnecessary medical disputes.

Recently, some conventional assessment methods in cooperation with facial recognition and having more scientific knowledge have been proposed. However, the conventional assessment methods are still lacking in the ability to grape the recognizability and variability of the facial feature points of many different faces in facial image recognition, as well as the ability to combine treatment effects with artificial intelligence for big data analysis. Therefore, it is important to provide an assessment scheme for aesthetic medicine by using a scientific and artificial intelligence evaluation mechanism.

SUMMARY OF THE INVENTION

An object of the present invention provides antiaging assessment method and an antiaging assessment device for facial rejuvenation in a scoring manner.

Another object of the present invention provides an antiaging assessment method and an antiaging assessment device for facial rejuvenation. A feature change value is obtained according to the comparison between two different facial features. The antiaging analysis is performed according to the feature change value. Consequently, the antiaging assessment method and the antiaging assessment device are more intuitive and reliable.

A further object of the present invention provides an antiaging assessment method and an antiaging assessment device for facial rejuvenation by using a scientific and AI-assisted mechanism.

In accordance with an aspect of the present invention, an antiaging assessment method for facial rejuvenation is provided. The antiaging assessment method includes the following steps. In a step (a) an under-test facial image is acquired. In a step (b), plural facial key points in the under-test facial image are recognized. Consequently, plural facial features are obtained. In addition, a spatial relationship between at least two facial key points of the plural facial key points is defined as at least one facial feature. In a step (c), at least one reference feature is inputted, and a feature change comparison between the at least one reference feature and the at least one facial feature is performed. Consequently, at least one feature change value between the at least one reference feature and the at least one facial feature is obtained. In a step (d), a facial rejuvenation score index is acquired from a facial rejuvenation score index data table according to the at least one feature change value. In a step (d), a facial rejuvenation score index is acquired from a facial rejuvenation score index data table according to the at least one feature change value. In the facial rejuvenation score index data table, each of the at least one facial feature is related to plural feature change value ranges, and each of the plural feature change value ranges is related to a corresponding facial rejuvenation score index. When a specified feature change value lies in a specified feature change value range of the plural feature change value ranges, the corresponding facial rejuvenation score index is obtained.

In an embodiment, the plural facial key points at least include a brow, a pupil, a nose wing, an eyebrow tail, an eyebrow peak, an outer canthus and a mouth corner.

In an embodiment, the at least one facial feature angle defined by the facial key points includes at least one facial feature angle or at least one facial feature length. The at least one facial feature angle includes a first facial feature angle, a second facial feature angle, a third facial feature angle and a fourth facial feature angle. The at least one facial feature length includes a first facial feature length, a second facial feature length, a third facial feature length, a fourth facial feature length, a fifth facial feature length and a sixth facial feature length.

In an embodiment, the first facial feature angle is defined by a line from the eyebrow peak to the brow and a horizontal line extending from the brow, the second facial feature angle is defined by a line from the eyebrow tail to the brow and the horizontal line extending from the brow, the third facial feature angle is defined by a line from an outer side of the pupil to the nose wing and a line from the nose wing to the eyebrow peak, and the fourth facial feature is defined by a line passing through the nose wing and the mouth corner and a line passing through the mouth corner and the outer canthus.

Preferably, in the facial rejuvenation score index data table, the plural feature change value ranges include 11 feature change value ranges corresponding to the first facial feature angle. In the 11 feature change value ranges, the feature change value range larger than +10° provides a youngest information, and the corresponding facial rejuvenation score index is 10 points. In the 11 feature change value ranges, the feature change value range smaller than −10° provides an oldest information and the corresponding facial rejuvenation score index is 0 point. In the 11 feature change value ranges, a sixth feature change value range is −1.11°~+1.11°, and the corresponding facial rejuvenation score index is 5 points.

Preferably, in the facial rejuvenation score index data table, the plural feature change value ranges include 11 feature change value ranges corresponding to the second facial feature angle. In the 11 feature change value ranges, the feature change value range larger than +10° provides a youngest information, and the corresponding facial rejuvenation score index is 10 points. In the 11 feature change value ranges, the feature change value range smaller than −10° provides an oldest information and the corresponding facial rejuvenation score index is 0 point. In the 11 feature change value ranges, a sixth feature change value range is −1.11°~+1.11°, and the corresponding facial rejuvenation score index is 5 points.

Preferably, in the facial rejuvenation score index data table, the plural feature change value ranges include 11 feature change value ranges corresponding to the third facial feature angle. In the 11 feature change value ranges, the feature change value range smaller than −10° provides a youngest information, and the corresponding facial rejuvenation score index is 10 points. In the 11 feature change value ranges, the feature change value range larger than +10° provides an oldest information and the corresponding facial rejuvenation score index is 0 point. In the 11 feature change value ranges, a sixth feature change value range is −1.11°~+1.11°, and the corresponding facial rejuvenation score index is 5 points.

Preferably, in the facial rejuvenation score index data table, the plural feature change value ranges include 11 feature change value ranges corresponding to the fourth facial feature angle. In the 11 feature change value ranges, the feature change value range larger than +10° provides a youngest information, and the corresponding facial rejuvenation score index is 10 points. In the 11 feature change value ranges, the feature change value range smaller than −10° provides an oldest information and the corresponding facial rejuvenation score index is 0 point. In the 11 feature change value ranges, a sixth feature change value range is −1.11°~+1.11°, and the corresponding facial rejuvenation score index is 5 points.

In an embodiment, the plural facial key points further include an inferior eyebrow, a superior orbital edge, an upper eyelid, a lower eyelid, an iris, a left tragus, a right tragus and a chin tip. The first facial feature length is a distance between the inferior eyebrow and the superior orbital edge. The second facial feature length is a distance between the superior orbital edge and the upper eyelid. The third facial feature length is a distance between the upper eyelid and the lower eyelid. The fourth facial feature length is a distance between the eyebrow peak and the iris. The fifth facial feature length is a sum of a length between the left tragus and the mouth corner and a length between the right tragus and the mouth corner. The sixth facial feature length is a sum of a length between the left tragus and the chin tip and a length between the right tragus and the chin tip.

Preferably, in the facial rejuvenation score index data table, the plural feature change value ranges include 11 feature change value ranges corresponding to the first facial feature length. In the 11 feature change value ranges, the feature change value range larger than +3 mm provides a youngest information, and the corresponding facial rejuvenation score index is 10 points. In the 11 feature change value ranges, the feature change value range smaller than −3 mm provides an oldest information and the corresponding facial rejuvenation score index is 0 point. In the 11 feature change value ranges, a sixth feature change value range is −0.33 mm~+0.33 mm, and the corresponding facial rejuvenation score index is 5 points.

Preferably, in the facial rejuvenation score index data table, the plural feature change value ranges include 11 feature change value ranges corresponding to the second facial feature length. In the 11 feature change value ranges, the feature change value range smaller than −3 mm provides a youngest information, and the corresponding facial rejuvenation score index is 10 points. In the 11 feature change value ranges, the feature change value range larger than +3 mm provides an oldest information and the corresponding facial rejuvenation score index is 0 point. In the 11 feature change value ranges, a sixth feature change value range is −0.33 mm~+0.33 mm, and the corresponding facial rejuvenation score index is 5 points.

Preferably, in the facial rejuvenation score index data table, the plural feature change value ranges include 11 feature change value ranges corresponding to the third facial feature length. In the 11 feature change value ranges, the feature change value range larger than +3 mm provides a youngest information, and the corresponding facial rejuvenation score index is 10 points. In the 11 feature change value ranges, the feature change value range smaller than −3 mm provides an oldest information and the corresponding facial rejuvenation score index is 0 point. In the 11 feature change value ranges, a sixth feature change value range is −0.33 mm~+0.33 mm, and the corresponding facial rejuvenation score index is 5 points.

Preferably, in the facial rejuvenation score index data table, the plural feature change value ranges include 11 feature change value ranges corresponding to the fourth facial feature length. In the 11 feature change value ranges, the feature change value range smaller than −3 mm provides a youngest information, and the corresponding facial rejuvenation score index is 10 points. In the 11 feature change value ranges, the feature change value range larger than +3 mm provides an oldest information and the corresponding facial rejuvenation score index is 0 point. In the 11 feature change value ranges, a sixth feature change value range is −0.33 mm~+0.33 mm, and the corresponding facial rejuvenation score index is 5 points.

Preferably, in the facial rejuvenation score index data table, the plural feature change value ranges include 11 feature change value ranges corresponding to the fifth facial feature length. In the 11 feature change value ranges, the feature change value range smaller than −10 mm provides a youngest information, and the corresponding facial rejuvenation score index is 10 points. In the 11 feature change value ranges, the feature change value range larger than +10 mm provides an oldest information and the corresponding facial rejuvenation score index is 0 point. In the 11 feature change value ranges, a sixth feature change value range is −1.11 mm~+1.11 mm, and the corresponding facial rejuvenation score index is 5 points.

Preferably, in the facial rejuvenation score index data table, the plural feature change value ranges include 11 feature change value ranges corresponding to the sixth facial feature length. In the 11 feature change value ranges, the feature change value range smaller than −10 mm provides a youngest information, and the corresponding facial rejuvenation score index is 10 points. In the 11 feature change value ranges, the feature change value range larger than +10 mm provides an oldest information and the corresponding facial rejuvenation score index is 0 point. In the 11 feature change value ranges, a sixth feature change value range is −1.11 mm~+1.11 mm, and the corresponding facial rejuvenation score index is 5 point.

In an embodiment, the at least one reference feature is acquired before an aesthetic treatment is given to a patient, and the at least one facial feature is acquired after the aesthetic treatment is given to the patient. Alternatively, the at least one reference feature is acquired from a treatment course of the aesthetic treatment, and the at least one facial feature is acquired from another treatment course of the aesthetic treatment. Alternatively, the at least one reference feature is acquired from a historical facial image of the patient in the past, and the at least one facial feature is acquired from the under-test facial image of the patient at present.

In an embodiment, after the step (d), the antiaging assessment method further includes a step (e) of counting the at least one facial rejuvenation score index and calculating a facial antiaging assessment information.

In an embodiment, the at least one facial feature is acquired from the under-test facial image of the patient at present, the at least one reference feature is acquired from a big data analysis facial image after various facial images are subjected to the big data analysis, and the facial antiaging assessment information is a simulated/predicted facial antiaging assessment information. The big data analysis facial image is acquired by using an artificial intelligence analysis and training method.

In accordance with another aspect of the present invention, an antiaging assessment device for facial rejuvenation is provided. The antiaging assessment device includes a facial image input module, an artificial intelligence facial recognition module, a facial feature reference/historical database, a facial surface rejuvenation measurement unit and a facial rejuvenation score index establishment and assessment unit. The facial image input module includes a facial image photographing unit and a positioning mechanism. The facial image photographing unit acquires an under-test facial image. The positioning mechanism stabilizes a head of a patient and positions the facial image photographing unit. Consequently, the under-test facial image is acquired by the facial image photographing unit stably. The artificial intelligence facial recognition module is connected with the facial image input module. The artificial intelligence facial recognition module includes a facial key point detection unit and a facial feature description unit. The artificial intelligence facial recognition module recognizes plural facial key points in the under-test facial image. Consequently, plural facial features are obtained. A spatial relationship between at least two facial key points of the plural facial key points is defined as at least one facial feature. The facial feature reference/historical database provides at least one reference feature. The facial surface rejuvenation measurement unit is connected with the artificial intelligence facial recognition module and the facial feature reference/historical database, wherein after the facial surface rejuvenation measurement unit receives the at least one reference feature, the facial surface rejuvenation measurement unit performs a feature change comparison between the at least one reference feature and the at least one facial feature, so that at least one feature change value between the at least one reference feature and the at least one facial feature is obtained. The facial rejuvenation score index establishment and assessment unit is connected with the facial surface rejuvenation measurement unit. The facial rejuvenation score index establishment and assessment unit contains a facial rejuvenation score index data table, wherein the facial rejuvenation score index establishment and assessment unit acquires a corresponding facial rejuvenation score index from the facial rejuvenation score index data table according to the at least one feature change value. In the facial rejuvenation score index data table, each of the at least one facial feature is related to plural feature change value ranges, and each of the plural feature change value ranges is related to the corresponding facial rejuvenation score index. When a specified feature change value lies in a specified feature change value range of the plural feature change value ranges, the corresponding facial rejuvenation score index is obtained.

In an embodiment, the plural facial key points at least include a brow, a pupil, a nose wing, an eyebrow tail, an eyebrow peak, an outer canthus, a mouth corner, an inferior eyebrow, a superior orbital edge, an upper eyelid, a lower eyelid, an iris, a left tragus, a right tragus and a chin tip.

In an embodiment, the at least one facial feature angle defined by the facial key points includes at least one facial feature angle or at least one facial feature length. The at least one facial feature angle includes a first facial feature angle, a second facial feature angle, a third facial feature angle and a fourth facial feature angle. The at least one facial feature length includes a first facial feature length, a second facial feature length, a third facial feature length, a fourth facial feature length, a fifth facial feature length and a sixth facial feature length.

In an embodiment, the antiaging assessment device further includes an output unit. The output unit is connected with the facial surface rejuvenation measurement unit and the facial rejuvenation score index establishment and assessment unit. The at least one facial feature and the corresponding facial rejuvenation score index are outputted from the output unit. After plural facial rejuvenation score indexes are accumulated and counted by the facial rejuvenation score index establishment and assessment unit, a facial antiaging assessment information is obtained, and the facial antiaging assessment information is transmitted to the output unit.

In an embodiment, the antiaging assessment device further includes a facial surface simulation/prediction unit, a drug/dosage/aesthetic treatment plan suggestion unit and an artificial intelligence analysis and training module. The facial surface simulation/prediction unit is connected with the artificial intelligence facial recognition module and the facial feature reference/historical database. After a big data analysis facial feature is inputted into the facial surface simulation/prediction unit, the at least one reference feature is obtained, and another feature change comparison between the at least one reference feature and the at least one facial feature is performed. Consequently, a simulated/predicted feature change value between the at least one reference feature and the at least one facial feature is obtained. The facial rejuvenation score index establishment and assessment unit acquires the corresponding facial rejuvenation score index from the facial rejuvenation score index data table according to the simulated/predicted feature change value. After plural facial rejuvenation score indexes are accumulated and counted by the facial rejuvenation score index establishment and assessment unit, a simulated/predicted facial antiaging assessment information is obtained. The drug/dosage/aesthetic treatment plan suggestion unit is connected with the facial rejuvenation score index establishment and assessment unit and the output unit. The drug/dosage/aesthetic treatment plan suggestion unit provides a drug/dosage/aesthetic treatment plan suggestion information to the output unit according to the facial antiaging assessment information and the simulated/predicted facial antiaging assessment information. The artificial intelligence analysis and training module is connected with the facial rejuvenation score index establishment and assessment unit, the drug/dosage/aesthetic treatment plan suggestion unit and the output unit. The artificial intelligence analysis and training module performs an artificial intelligence analysis and training process according to at least one of the facial antiaging assessment information, the simulated/predicted facial antiaging assessment information and the drug/dosage/aesthetic treatment plan suggestion information.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 2A, 2B and 2C schematically illustrate the positions of a first facial feature angle α and a second facial feature angle β, plural feature change value ranges corresponding to the angle change levels of the first facial feature angle α and the second facial feature angle β and the corresponding facial rejuvenation score indexes;

FIGS. 3A, 3B and 3C schematically illustrate the positions of a third facial feature angle γ and a fourth facial feature angle δ, plural feature change value ranges corresponding to the angle change levels of the third facial feature angle γ and the fourth facial feature angle δ and the corresponding facial rejuvenation score indexes;

FIGS. 5A, 5B and 5C schematically illustrate the positions of a second facial feature length and a third facial feature length, plural feature change value ranges corresponding to the angle change levels of the second facial feature length and the third facial feature length and the corresponding facial rejuvenation score indexes;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides an antiaging assessment method and an antiaging assessment device for facial rejuvenation. In an embodiment, the angular or length spatial relationship between various facial key points in an under-test facial image is firstly subjected to a precise feature description, so that a facial feature including a facial feature angle or a facial feature length is obtained. Then, the facial feature is compared with the reference feature, and the feature change between the facial feature and the reference feature is analyzed. After the comparison and analysis, a feature change value is obtained. The feature change value is related to a facial rejuvenation score index. The antiaging assessment method and the antiaging assessment device are provided to comprehensively evaluate and accurately measure the facial aging degree of the patient and provides a specific quantitative presentation about the therapeutic effect comparison before and after treatment. Furthermore, through the big data simulation/prediction, the probability of the facial aging degree of the patient and the possible quantitative therapeutic effect can be predicted.

In an embodiment, the patient's medical information can be accurately recorded. Moreover, if the assessment and treatment data are counted and presented as a historical database, it will also be possible to assess the possible therapeutic effect for new patients in the future. By using an artificial intelligence analysis and training method immediately, the estimated treatment dose can be accurately proposed, and the effect of aesthetic medicine can be simulated.

Figure 1:
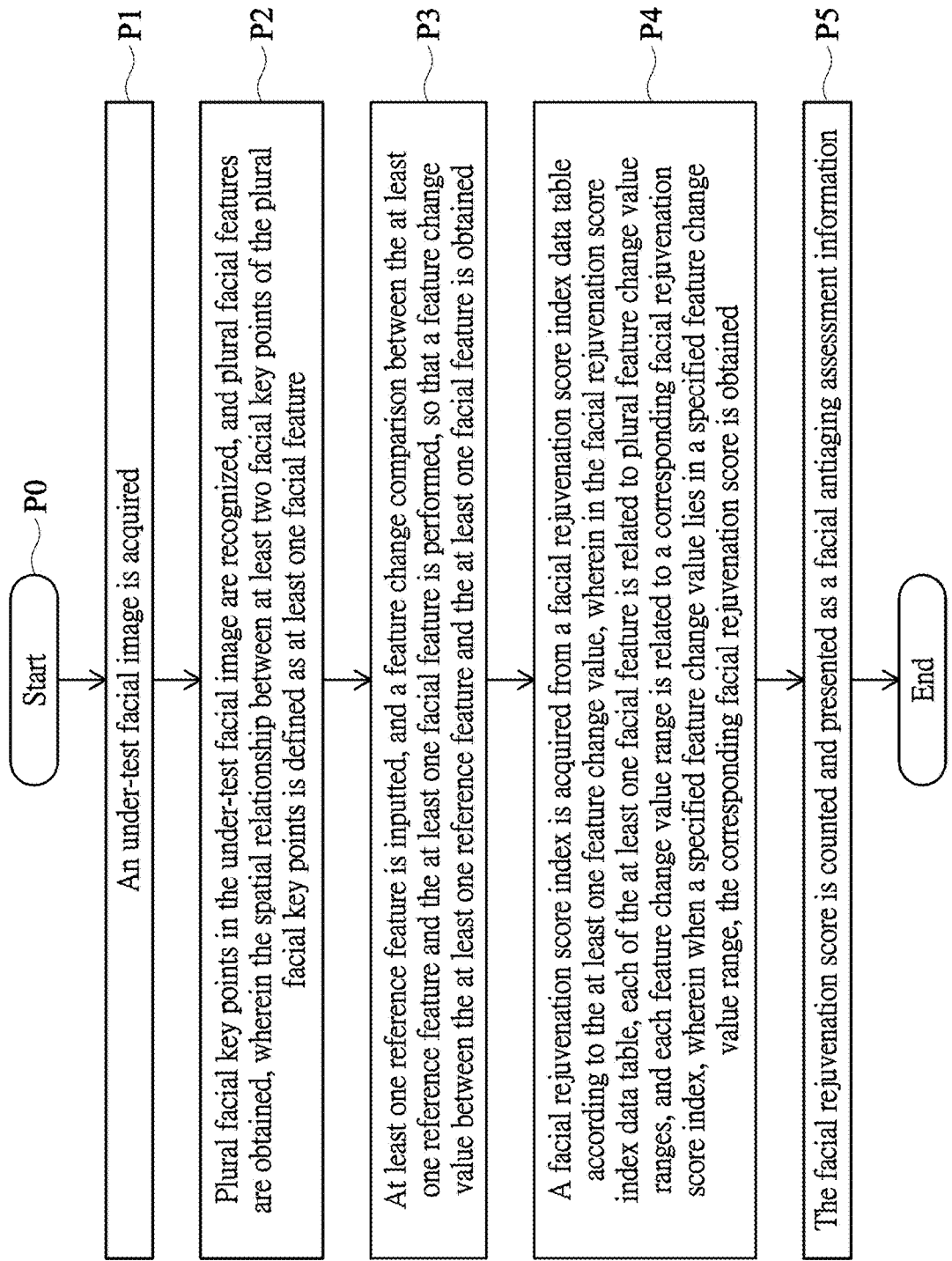
FIG. 1 is a flowchart of an antiaging assessment method according to an embodiment of the present invention.

FIG. 1 is a flowchart of an antiaging assessment method according to an embodiment of the present invention. The antiaging assessment method at least comprises the following steps.

In a step P0, the flowchart is started.

In a step P1, an under-test facial image is acquired.

In a step P2, plural facial key points in the under-test facial image are recognized, and plural facial features are obtained. Moreover, the spatial relationship between at least two facial key points of the plural facial key points is defined as at least one facial feature.

The at least one facial feature defined by the facial key points includes at least one facial feature angle or at least one facial feature length.

In a step P3, at least one reference feature is inputted, and a feature change comparison between the at least one reference feature and the at least one facial feature is performed, so that at least one feature change value between the at least one reference feature and the at least one facial feature is obtained.

In a step P4, a facial rejuvenation score index is acquired from a facial rejuvenation score index data table according to the at least one feature change value.

In the facial rejuvenation score index data table, each of the at least one facial feature is related to plural feature change value ranges. Each feature change value range is related to a corresponding facial rejuvenation score index. When a specified feature change value lies in a specified feature change value range, the corresponding facial rejuvenation score index is obtained.

In a step P5, the facial rejuvenation score index is counted and presented as a facial antiaging assessment information.

Hereinafter, the operations of the antiaging assessment method will be illustrated in more details with reference to FIGS. 2A to 7C. In FIGS. 2A, 3A, 4A, 5A, 6A and 7A, the plural facial key points and the at least one facial feature angle or the at least one facial feature length are shown or indicated on the corresponding positions of the under-test facial image. In FIGS. 2B, 2C, 3B, 3C, 4B, 5B, 5C, 6B, 7B and 7C, plural sets of feature change value ranges and plural sets of corresponding facial rejuvenation score indexes are listed as the corresponding facial rejuvenation score index data tables mentioned in the flowchart of FIG. 1.

In FIG. 2A to FIG. 7C, the facial key points at least include a brow Eh, a pupil Pu, a nose wing Na, an eyebrow tail Et, an eyebrow peak Ep, an outer canthus Cl, a mouth corner Oc, an inferior eyebrow Ei, a superior orbital edge Os, an upper eyelid Ps, a lower eyelid Pi, an iris Il, a left tragus Tr, a right tragus Tr and a chin tip Mp. It is noted that the contents of the facial key points are not restricted.

The outer canthus Cl is the junction between the upper eyelid and lower eyelid.

In FIG. 2A to FIG. 7C, the at least one facial feature angle defined by the facial key points includes four facial feature angles, and the at least one facial feature length defined by the facial key points includes six facial feature lengths. The four facial feature angles include a first facial feature angle α, a second facial feature angle β, a third facial feature angle γ and a fourth facial feature angle δ. The six facial feature lengths include a first facial feature length a, a second facial feature length b, a third facial feature length c, a fourth facial feature length d, a fifth facial feature length e and a sixth facial feature length f. Each of the four facial feature angles α, β, γ, δ and the sixth facial feature lengths a, b, c, d, e, f is a spatial relationship between at least one static facial key point and at least one moving facial key point.

Figures 2A, 2B:
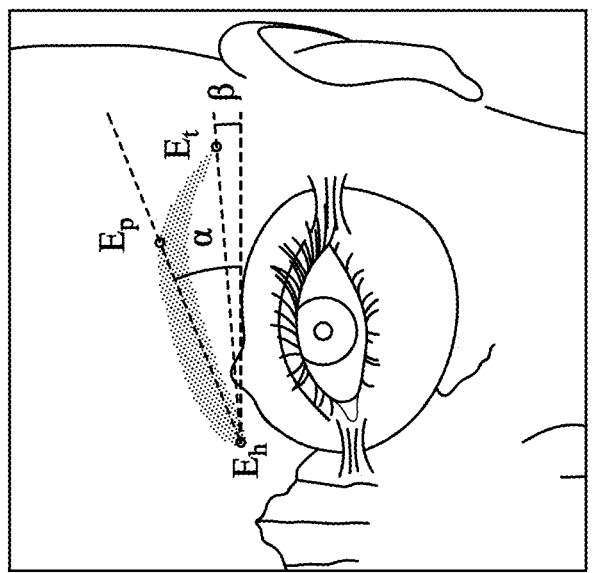

FIGS. 2A, 2B and 2C schematically illustrate the positions of a first facial feature angle α and a second facial feature angle β, plural feature change value ranges corresponding to the angle change levels of the first facial feature angle α and the second facial feature angle β and the corresponding facial rejuvenation score indexes.

Please refer to FIGS. 2A and 2B. In FIG. 2A, the first facial feature angle α is related to the lift of the eyebrow peak Ep. That is, the first facial feature angle α is related to a lift angle of the eyebrow peak Ep with respect to the horizontal line extending from the brow Eh. This angle is defined by the line from the eyebrow peak Ep to the brow Eh and the horizontal line extending from the brow Eh. The increase of the first facial feature angle α represents the enhanced rejuvenation.

In the facial rejuvenation score index data table of FIG. 2B, 11 feature change value ranges Δα corresponding to the first facial feature angle α and the corresponding facial rejuvenation score indexes ΔαS are listed. The feature change value range Δα larger than +10° provides the youngest information, and the corresponding facial rejuvenation score index ΔαS is 10 points (full score). The feature change value range Δα smaller than −10° provides the oldest information, and the corresponding facial rejuvenation score index ΔαS is 0 point. The sixth feature change value range Δα of the 11 feature change value ranges Δα is −1.11°~+1.11°, and the corresponding facial rejuvenation score index ΔαS is 5 points.

For example, the reference feature of a patient recognized and acquired before the aesthetic treatment is a facial feature angle α1 (not shown in FIG. 2A), and the facial feature of the patient recognized and acquired after the aesthetic treatment is a facial feature angle α2 (not shown in FIG. 2A). After a feature change comparison process is performed, a feature change value is obtained. The feature change value is an angle change value between the facial feature angle α1 and the facial feature angle α2 (i.e., α2−α1) is obtained. For example, the angle change value is 6°. Since the feature change value lies in the ninth feature change value range Δα (e.g., 5.57°~7.78° of the table shown in FIG. 2B, the corresponding feature change value range ΔαS is 8 points. In this exemplary experiment, the first facial feature angle α before the aesthetic treatment and the first facial feature angle α after the before the aesthetic treatment are compared and analyzed. According to the comparison and analysis result, the patient can receive the improvement change in a more intuitive and specific manner and feel the improvement effectiveness about facial rejuvenation.

Please refer to FIGS. 2A and 2C. In FIG. 2A, the second facial feature angle β is related to the lift of the eyebrow tail Et. That is, the second facial feature angle β is related to a lift angle of the eyebrow tail Et with respect to the horizontal line extending from the brow Eh. This angle is defined by the line from the eyebrow tail Et to the brow Eh and the horizontal line extending from the brow Eh. The increase of the second facial feature angle β represents the enhanced rejuvenation.

In the facial rejuvenation score index data table of FIG. 2C, 11 feature change value ranges Δβ corresponding to the second facial feature angle β and the corresponding facial rejuvenation score indexes ΔβS are listed. The feature change value range Δβ larger than +10° provides the youngest information, and the corresponding facial rejuvenation score index ΔαS is 10 points (full score). The feature change value range Δβ smaller than −10° provides the oldest information, and the corresponding facial rejuvenation score index ΔβS is 0 point. The sixth feature change value range Δβ of the 11 feature change value ranges Δβ is −1.11°~+1.11°, and the corresponding facial rejuvenation score index ΔβS is 5 points.

Figures 3A, 3B:
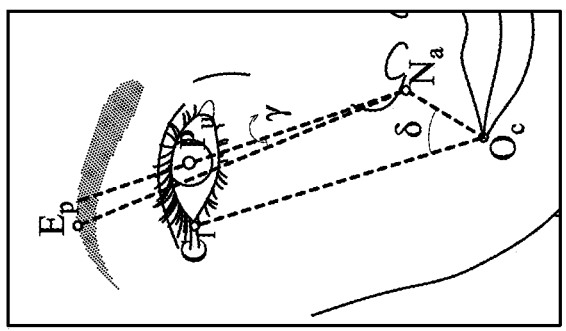

FIGS. 3A, 3B and 3C schematically illustrate the positions of a third facial feature angle γ and a fourth facial feature angle δ, plural feature change value ranges corresponding to the angle change levels of the third facial feature angle γ and the fourth facial feature angle δ and the corresponding facial rejuvenation score indexes.

Please refer to FIGS. 3A and 3B. In FIG. 3A, the third facial feature angle γ is related to the perfect angle of the eyebrow peak Ep. That is, the third facial feature angle γ is related to an angle between the line passing through the nose wing Na and the pupil Pu and the line passing through the nose wing Na and the eyebrow peak Ep with the nose wing Na serving as the vertex. The ideal angle is 0. This angle is defined by the line from the outer side of the pupil Pu to the nose wing Na and the line from the nose wing Na to the eyebrow peak Ep. In case that the line passing through the outer side of the pupil Pu is the base line, the angle with respect to the inside is negative, and the angle with respect to the outside is positive. The angle of zero is the best (moderate). That is, if the face is sagging, the third facial feature angle γ is more positive. Whereas, if the face is lifted, the third facial feature angle γ is more negative.

In the facial rejuvenation score index data table of FIG. 3B, 11 feature change value ranges Δγ corresponding to the third facial feature angle γ and the corresponding facial rejuvenation score indexes ΔγS are listed. The feature change value range Δγ smaller than −10° provides the youngest information, and the corresponding facial rejuvenation score index ΔγS is 10 points (full score). The feature change value range Δγ larger than +10° provides the oldest information, and the corresponding facial rejuvenation score index ΔγS is 0 point. The sixth feature change value range Δγ of the 11 feature change value ranges Δγ is −1.11°~+1.11°, and the corresponding facial rejuvenation score index ΔγS is 5 points.

For example, the reference feature of a patient recognized and acquired before the aesthetic treatment is a facial feature angle γ1 (not shown in FIG. 3A), and the facial feature of the patient recognized and acquired after the aesthetic treatment is a facial feature angle γ2 (not shown in FIG. 3A). After a feature change comparison process is performed, a feature change value is obtained. The feature change value is an angle change value between the facial feature angle γ1 and the facial feature angle γ2 (i.e., γ2−γ1) is obtained. For example, the angle change value is −1.5°. Since the feature change value lies in the seventh feature change value range Δγ (e.g.)−1.12°~−3.33° of the table shown in FIG. 3B, the corresponding feature change value range ΔγS is 6 points. In this exemplary experiment, the third facial feature angle γ before the aesthetic treatment and the third facial feature angle γ after the before the aesthetic treatment are compared and analyzed. The angle change value corresponding to the improvement is not very large. However, since the corresponding feature change value range ΔγS is 6 points, the patient can feel the slight improvement of the therapeutic effect more clearly or specifically. Moreover, the change level is helpful to provides a valuable reference for the subsequent and continuous treatment.

Please refer to FIGS. 3A and 3C. In FIG. 3A, the fourth facial feature angle δ is related to the improvement angle of the midface (i.e., the region corresponding to one third of the face from the lower eyelid to the nasolabial junction). The fourth facial feature angle δ is an angle between the nose wing Na and the outer canthus Cl with the mouth corner Oc serving as the vertex. That is, the fourth facial feature angle δ is defined by the line passing through the nose wing Na and the mouth corner Oc and the line passing through the mouth corner Oc and the outer canthus Cl. That is, if the face is sagging, the fourth facial feature angle δ is smaller. Whereas, if the face is lifted, the fourth facial feature angle δ is larger.

In the facial rejuvenation score index data table of FIG. 3C, 11 feature change value ranges Δδ corresponding to the fourth facial feature angle δ and the corresponding facial rejuvenation score indexes ΔδS are listed. The feature change value range Δδ larger than +10° provides the youngest information, and the corresponding facial rejuvenation score index ΔδS is 10 points (full score). The feature change value range Δδ smaller than −10° provides the oldest information, and the corresponding facial rejuvenation score index ΔδS is 0 point. The sixth feature change value range Δδ of the 11 feature change value ranges Δδ is −1.11°~+1.11°, and the corresponding facial rejuvenation score index ΔδS is 5 points.

Figures 4A, 4B:
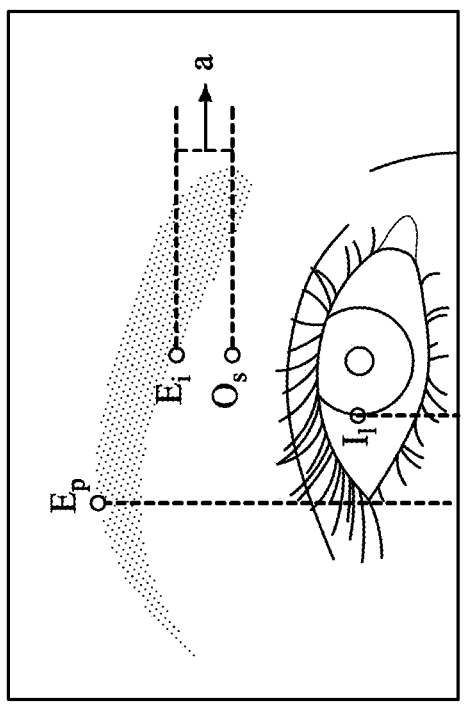
FIGS. 4A and 4B schematically illustrate the position of a first facial feature length, plural feature change value ranges corresponding to the length change level of the first facial feature length and the corresponding facial rejuvenation score indexes.
Figures 5A, 5B:
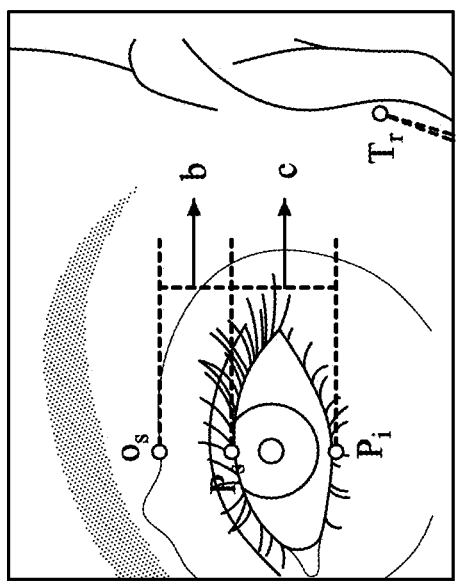
Figures 6A, 6B:
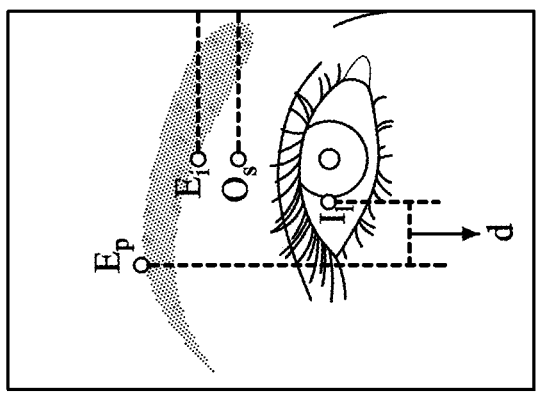
FIGS. 6A and 6B schematically illustrate the position of a fourth facial feature length, plural feature change value ranges corresponding to the length change level of the fourth facial feature length and the corresponding facial rejuvenation score indexes.
Figures 7A, 7B:
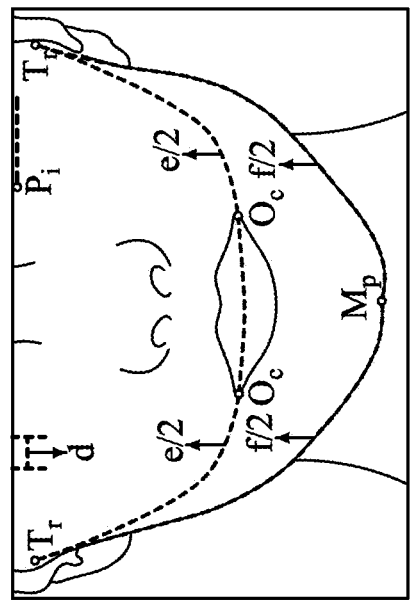
FIGS. 7A, 7B and 7C schematically illustrate the positions of a fifth facial feature length and a sixth facial feature length, plural feature change value ranges corresponding to the angle change levels of the fifth facial feature length and the sixth facial feature length and the corresponding facial rejuvenation score indexes.
Figure 7C:
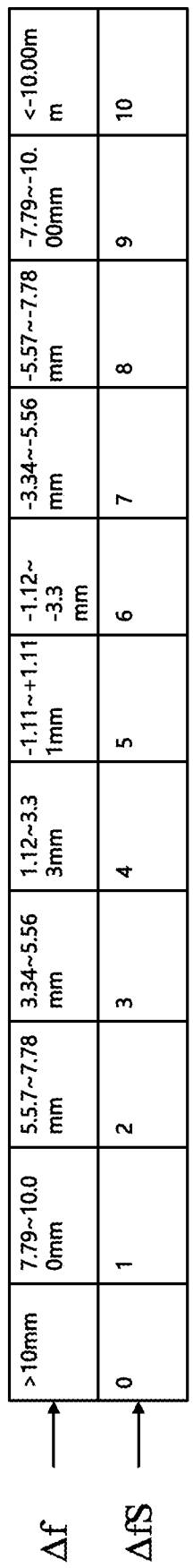

FIGS. 4A and 4B schematically illustrate the position of a first facial feature length, plural feature change value ranges corresponding to the length change level of the first facial feature length and the corresponding facial rejuvenation score indexes. FIGS. 5A, 5B and 5C schematically illustrate the positions of a second facial feature length and a third facial feature length, plural feature change value ranges corresponding to the angle change levels of the second facial feature length and the third facial feature length and the corresponding facial rejuvenation score indexes. FIGS. 6A and 6B schematically illustrate the position of a fourth facial feature length, plural feature change value ranges corresponding to the length change level of the fourth facial feature length and the corresponding facial rejuvenation score indexes. FIGS. 7A, 7B and 7C schematically illustrate the positions of a fifth facial feature length and a sixth facial feature length, plural feature change value ranges corresponding to the angle change levels of the fifth facial feature length and the sixth facial feature length and the corresponding facial rejuvenation score indexes.

In FIG. 4A, the first facial feature length a is related to the periocular lift distance. That is, the first facial feature length a is the distance between the inferior eyebrow Ei and the superior orbital edge Os. The increase of the first facial feature length a shown in FIG. 4A represents the enhanced rejuvenation.

In FIG. 5A, the second facial feature length b is related to the improvement distance in orbit. That is, the second facial feature length b is the distance between the superior orbital edge Os and the upper eyelid Ps. The decrease of the second facial feature length b shown in FIG. 5A represents the enhanced rejuvenation.

Moreover, in FIG. 5A, the third facial feature length c is related to the improvement distance in orbit. That is, the third facial feature length c is the distance between the upper eyelid Ps and the lower eyelid Pi. The increase of the third facial feature length c shown in FIG. 5A represents the enhanced rejuvenation.

In FIG. 6A, the fourth facial feature length d is related to the inward concentration distance of the eyebrow peak Ep. That is, the fourth facial feature length d is the distance between the eyebrow peak Ep and the iris Il. The decrease of the fourth facial feature length d shown in FIG. 6A represents the enhanced rejuvenation.

In FIG. 7A, the fifth facial feature length e is related to the lift improvement of the midface (i.e., the region corresponding to one third of the face from the lower eyelid to the nasolabial junction). That is, the fifth facial feature length e is the total length of the length (½e) between the left tragus Tr and the mouth corner Oc and the length (½e) between the right tragus Tr and the mouth corner Oc. The decreases of the total length (=½e+½e) of the fifth facial feature length e in FIG. 7A represents the enhanced rejuvenation.

In FIG. 7A, the sixth facial feature length f is related to the chin lift improvement of the lower face. That is, the sixth facial feature length f is the total length of the length (½f) between the left tragus Tr and the chin tip Mp and the length (½f) between the right tragus Tr and the chin tip Mp. The decreases of the total length (=½f+½f) of the sixth facial feature length f in FIG. 7A represents the enhanced rejuvenation.

In the facial rejuvenation score index data table of FIG. 4B, 11 feature change value ranges Δa corresponding to the first facial feature length a and the corresponding facial rejuvenation score indexes ΔaS are listed. The sixth feature change value range Δα of the 11 feature change value ranges Δα is −0.33 mm~+0.33 mm, and the corresponding facial rejuvenation score index ΔαS is 5 points. The feature change value range Δα larger than 3 mm provides the youngest information, and the corresponding facial rejuvenation score index ΔαS is 10 points (full score).

In the facial rejuvenation score index data table of FIG. 5B, 11 feature change value ranges Δb corresponding to the second facial feature length b and the corresponding facial rejuvenation score indexes ΔbS are listed. The sixth feature change value range Δb of the 11 feature change value ranges Δb is −0.33 mm~+0.33 mm, and the corresponding facial rejuvenation score index ΔbS is 5 points. The feature change value range Δb smaller than −3 mm provides the youngest information, and the corresponding facial rejuvenation score index ΔbS is 10 points (full score).

In the facial rejuvenation score index data table of FIG. 5C, 11 feature change value ranges Δc corresponding to the third facial feature length c and the corresponding facial rejuvenation score indexes ΔcS are listed. The sixth feature change value range Δc of the 11 feature change value ranges Δc is −0.33 mm~+0.33 mm, and the corresponding facial rejuvenation score index ΔcS is 5 points. The feature change value range Δc larger than 3 mm provides the youngest information, and the corresponding facial rejuvenation score index ΔcS is 10 points (full score).

In the facial rejuvenation score index data table of FIG. 6B, 11 feature change value ranges Δd corresponding to the fourth facial feature length d and the corresponding facial rejuvenation score indexes ΔdS are listed. The sixth feature change value range Δd of the 11 feature change value ranges Δd is −0.33 mm~+0.33 mm, and the corresponding facial rejuvenation score index ΔdS is 5 points. The feature change value range Δd smaller than −3 mm provides the youngest information, and the corresponding facial rejuvenation score index ΔdS is 10 points (full score).

In the facial rejuvenation score index data table of FIG. 7B, 11 feature change value ranges Δe corresponding to the fifth facial feature length e and the corresponding facial rejuvenation score indexes ΔeS are listed. The sixth feature change value range Δe of the 11 feature change value ranges Δe is −0.11 mm~+0.11 mm, and the corresponding facial rejuvenation score index ΔeS is 5 points. The feature change value range Δe smaller than −10 mm provides the youngest information, and the corresponding facial rejuvenation score index ΔeS is 10 points (full score).

In the facial rejuvenation score index data table of FIG. 7C, 11 feature change value ranges Δf corresponding to the sixth facial feature length f and the corresponding facial rejuvenation score indexes ΔfS are listed. The sixth feature change value range Δf of the 11 feature change value ranges Δf is −0.11 mm~+0.11 mm, and the corresponding facial rejuvenation score index ΔfS is 5 points. The feature change value range Δf smaller than −10 mm provides the youngest information, and the corresponding facial rejuvenation score index ΔfS is 10 points (full score).

In an embodiment of FIG. 1, the at least one reference feature is acquired before the aesthetic treatment is given to the patient, and the at least one facial feature is acquired after the aesthetic treatment is given to the patient. It is noted that numerous modifications and alterations may be made while retaining the teachings of the invention. For example, in another embodiment, the at least one reference feature is acquired from a treatment course of the aesthetic treatment, and the at least one facial feature is acquired from another treatment course of the aesthetic treatment. Alternatively, the at least one reference feature is acquired from a historical facial image of the patient in the past, and the at least one facial feature is acquired from the under-test facial image of the patient at present.

In another embodiment of FIG. 1, the at least one facial feature is acquired from the current under-test facial image of the patient. However, the at least one reference feature is acquired after various facial images are subjected to the big data analysis. In other words, the at least one reference feature is acquired from a big data analysis facial image. In addition, the facial antiaging assessment information is a simulated/predicted facial antiaging assessment information. Especially, the facial images are subjected to the big data analysis by using an artificial intelligence analysis and training method.

From the above descriptions, the present invention provides the antiaging assessment method and the antiaging assessment device for facial rejuvenation. By the antiaging assessment method and the antiaging assessment device of the present invention, the feature change value of the patient before/after the aesthetic treatment, the feature change value of the patient between treatment courses of the aesthetic treatment or the feature change value of the patient with respect to the historical treatment data can be obtained through comparison and analysis. Moreover, a facial antiaging assessment information or a simulated/predicted facial antiaging assessment information can be obtained by using a scoring mechanism corresponding to the feature change value. Consequently, the facial change condition of the patient at this moment can be quickly and specifically realized, or the possible facial change condition of the patient in the future can be simulated or predicted.

Figure 8A:
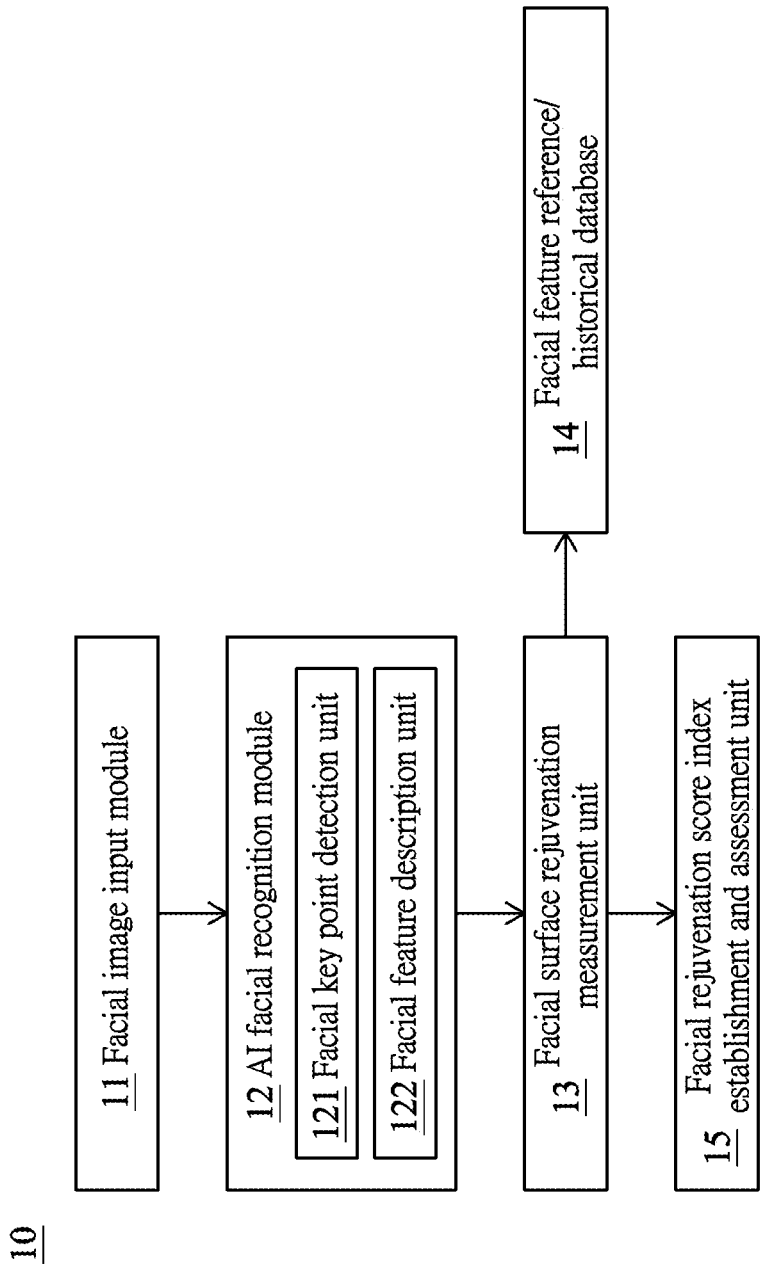
FIG. 8A is a schematic functional block diagram illustrating an antiaging assessment device using the antiaging assessment method of FIG. 1.
Figure 8B:
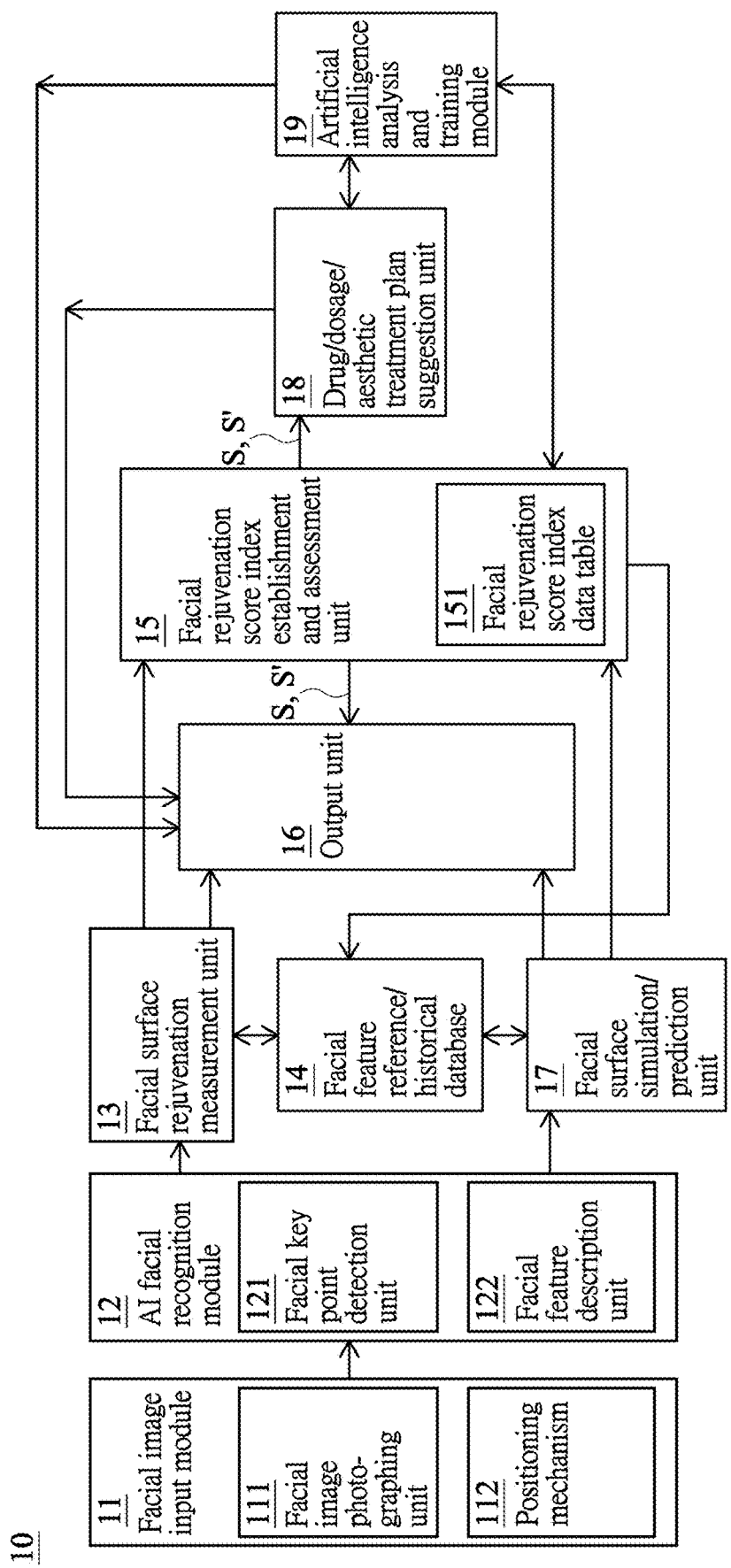
FIG. 8B is a schematic functional block diagram illustrating an implementation example of the antiaging assessment device as shown in FIG. 8A.

FIG. 8A is a schematic functional block diagram illustrating an antiaging assessment device using the antiaging assessment method of FIG. 1. FIG. 8B is a schematic functional block diagram illustrating an implementation example of the antiaging assessment device as shown in FIG. 8A.

The antiaging assessment device is provided for facial rejuvenation. As shown in FIG. 8A, the antiaging assessment device 10 at least comprises a facial image input module 11, an artificial intelligence (AI) facial recognition module 12 with a facial key point detection unit 121 and a facial feature description unit 122, a facial surface rejuvenation measurement unit 13, a facial feature reference/historical database 14 and a facial rejuvenation score index establishment and assessment unit 15.

The facial image input module 11 is used for acquiring the under-test facial image. The AI facial recognition module 12 is connected with the facial image input module 11. The AI facial recognition module 12 is used for receiving the under-test facial image and recognizing the plural facial key points in the under-test facial image. Consequently, as at least one facial feature is produced. Moreover, the spatial relationship between at least two facial key points of the plural facial key points is defined as the at least one facial feature.

The facial feature reference/historical database 14 is used for providing the at least one reference feature.

The facial surface rejuvenation measurement unit 13 is connected with the AI facial recognition module 12 and the facial feature reference/historical database 14. The facial surface rejuvenation measurement unit 13 receives the at least one reference feature and performs a feature change comparison between the at least one reference feature and the at least one facial feature. Consequently, at least one feature change value between the at least one reference feature and the at least one facial feature is obtained.

The facial rejuvenation score index establishment and assessment unit 15 is connected with the facial surface rejuvenation measurement unit 13. As shown in FIG. 8B, the facial rejuvenation score index establishment and assessment unit 15 contains a facial rejuvenation score index data table 151. According to the at least one feature change value from the facial surface rejuvenation measurement unit 13, the facial rejuvenation score index establishment and assessment unit 15 acquires the corresponding facial rejuvenation score index from the facial rejuvenation score index data table 151.

Preferably but not exclusively, the facial key points for the antiaging assessment device include the facial key points mentioned in FIGS. 2A to 7C. For example, the facial key points include the brow Eh, the pupil Pu, the nose wing Na, the eyebrow tail Et, the eyebrow peak Ep, the outer canthus Cl, the inferior eyebrow Ei, the superior orbital edge Os, the upper eyelid Ps, the lower eyelid Pi, the iris Il, the left tragus Tr, the right tragus Tr and the chin tip Mp.

In the antiaging assessment device, the at least one facial feature defined by the facial key points includes at least one facial feature angle or at least one facial feature length. In FIG. 2A to FIG. 7C, the at least one facial feature angle includes the first facial feature angle α, the second facial feature angle β, the third facial feature angle γ and the fourth facial feature angle δ, and the at least one facial feature length includes the first facial feature length a, the second facial feature length b, the third facial feature length c, the fourth facial feature length d, the fifth facial feature length e and the sixth facial feature length f.

The implementation example of the antiaging assessment device will be illustrated in more details with reference to FIG. 8B. As shown in FIG. 8B, the facial image input module 11 comprises a facial image photographing unit 111 and a positioning mechanism 112. The facial image photographing unit 111 is used for acquiring the under-test facial image. The positioning mechanism 112 is used to stabilize the patient's head and position the facial image photographing unit 111. Consequently, the under-test facial image can be acquired in a stable manner.

In an embodiment, the antiaging assessment device 10 further comprises an output unit 16. The output unit 16 is connected with the facial surface rejuvenation measurement unit 13 and the facial rejuvenation score index establishment and assessment unit 15. The at least one facial feature and the corresponding facial rejuvenation score index can be outputted from the output unit 16. Moreover, after plural facial rejuvenation score indexes are accumulated and counted by the facial rejuvenation score index establishment and assessment unit 15, the facial antiaging assessment information S can be obtained. Then, the facial antiaging assessment information S is transmitted to the output unit 16.

In an embodiment, the antiaging assessment device 10 further comprises a facial surface simulation/prediction unit 17. The facial surface simulation/prediction unit 17 is electrically connected with the AI facial recognition module 12 and the facial feature reference/historical database 14. After various facial features are subjected to the big data analysis and inputted into the facial surface simulation/prediction unit 17, at least one reference feature is acquired. In other words, the at least one reference feature is acquired from a big data analysis facial feature. Then, a feature change comparison between the at least one reference feature and the at least one facial feature is performed. Consequently, a simulated/predicted feature change value between the at least one reference feature and the at least one facial feature is obtained. According to the simulated/predicted feature change value from the facial surface simulation/prediction unit 17, the facial rejuvenation score index establishment and assessment unit 15 acquires the corresponding facial rejuvenation score index from the facial rejuvenation score index data table 151. Moreover, after plural facial rejuvenation score indexes are accumulated and counted by the facial rejuvenation score index establishment and assessment unit 15, the simulated/predicted facial antiaging assessment information S' can be obtained. Then, the simulated/predicted facial antiaging assessment information S' is transmitted to the output unit 16.

In an embodiment, the antiaging assessment device 10 further comprises a drug/dosage/aesthetic treatment plan suggestion unit 18. The drug/dosage/aesthetic treatment plan suggestion unit 18 is connected with the facial rejuvenation score index establishment and assessment unit 15 and the output unit 16. According to the facial antiaging assessment information S and the simulated/predicted facial antiaging assessment information S', the drug/dosage/aesthetic treatment plan suggestion unit 18 provides a drug/dosage/aesthetic treatment plan suggestion information M to the output unit 16. Consequently, the drug/dosage/aesthetic treatment plan suggestion information M is shown on the output unit 16.

In an embodiment, the antiaging assessment device 10 further comprises an artificial intelligence analysis and training module 19. The artificial intelligence analysis and training module 19 is connected with the facial rejuvenation score index establishment and assessment unit 15, the drug/dosage/aesthetic treatment plan suggestion unit 18 and the output unit 16. According to at least one of the facial antiaging assessment information S, the simulated/predicted facial antiaging assessment information S' and the drug/dosage/aesthetic treatment plan suggestion information M, the artificial intelligence analysis and training module 19 performs an artificial intelligence analysis and training process.

Preferably, the facial rejuvenation score index establishment and assessment unit 15, the facial rejuvenation score index from the facial rejuvenation score index data table 151 and the drug/dosage/aesthetic treatment plan suggestion unit 18 are subjected to the artificial intelligence analysis and training process. Consequently, more accurate assessment and judgment about the effectiveness can be achieved. For example, the technologies of the present invention can combine various basic physiological characteristics of different users (e.g., age, gender, skin color, skin quality, past medical history, living habits, or the like) with various big data factors and implement the deep learning training process through artificial intelligence. Consequently, when the antiaging assessment device of the present invention is applied to any new patient, the training results of the aforementioned artificial intelligence can be used to directly and immediately provide estimates and recommendations to the new patient before the aesthetic treatment process is carried out and obtain the accurate assessment and judgment about the effectiveness after the aesthetic treatment process is carried out.

Of course, the hardware units used in the antiaging assessment device of FIGS. 8A and 8B can be cooperated with the artificial intelligence analysis and training module 19 to perform the pre-evaluation or post-evaluation on the aesthetic effectiveness in a more automatic and optimal manner. For example, when the facial image input module 11 is cooperatively subjected to the artificial intelligence analysis and training process, the positions of the facial key points can be obtained or recognized more precisely.

Moreover, each of the hardware units used in the antiaging assessment device of FIGS. 8A and 8B can be directly implemented with a hardware component and/or a field programmable gate array (FPGA). Alternatively, each of the hardware units is a combination of a hardware component and a firmware and/or a software.

From the above descriptions, the antiaging assessment method and the antiaging assessment device of the present invention can effectively solve the drawbacks of the conventional technologies. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An antiaging assessment method for facial rejuvenation, the antiaging assessment method comprising steps of:
    (a) acquiring an under-test facial image;
    (b) recognizing plural facial key points in the under-test facial image, so that plural facial features are obtained, wherein a spatial relationship between at least two facial key points of the plural facial key points is defined as at least one facial feature;
    (c) inputting at least one reference feature, and performing a feature change comparison between the at least one reference feature and the at least one facial feature, so that at least one feature change value between the at least one reference feature and the at least one facial feature is obtained; and (d) acquiring a facial rejuvenation score index from a facial rejuvenation score index data table according to the at least one feature change value, wherein in the facial rejuvenation score index data table, each of the at least one facial feature is related to plural feature change value ranges, and each of the plural feature change value ranges is related to a corresponding facial rejuvenation score index, wherein when a specified feature change value lies in a specified feature change value range of the plural feature change value ranges, the corresponding facial rejuvenation score index is obtained;

wherein the plural facial key points at least include a brow, a pupil, a nose wing, an eyebrow tail, an eyebrow peak, an outer canthus and a mouth corner, and wherein the at least one facial feature defined by the facial key points includes at least one facial feature angle or at least one facial feature length, and wherein the at least one facial feature angle includes a first facial feature angle, a second facial feature angle, a third facial feature angle and a fourth facial feature angle, and the at least one facial feature length includes a first facial feature length, a second facial feature length, a third facial feature length, a fourth facial feature length, a fifth facial feature length and a sixth facial feature length;

wherein the first facial feature angle is defined by a line from the eyebrow peak to the brow and a horizontal line extending from the brow, the second facial feature angle is defined by a line from the eyebrow tail to the brow and the horizontal line extending from the brow, the third facial feature angle is defined by a line from an outer side of the pupil to the nose wing and a line from the nose wing to the eyebrow peak, and the fourth facial feature angle is defined by a line passing through the nose wing and the mouth corner and a line passing through the mouth corner and the outer canthus.

2. The antiaging assessment method according to claim 1, wherein in the facial rejuvenation score index data table, the plural feature change value ranges include 11 feature change value ranges corresponding to the first facial feature angle, wherein in the 11 feature change value ranges, the feature change value range larger than +10° provides a youngest information, and the corresponding facial rejuvenation score index is 10 points, wherein in the 11 feature change value ranges, the feature change value range smaller than −10° provides an oldest information and the corresponding facial rejuvenation score index is 0 points, wherein in the 11 feature change value ranges, a sixth feature change value range is −1.11° to +1.11°, and the corresponding facial rejuvenation score index is 5 points.

3. The antiaging assessment method according to claim 1, wherein in the facial rejuvenation score index data table, the plural feature change value ranges include 11 feature change value ranges corresponding to the second facial feature angle, wherein in the 11 feature change value ranges, the feature change value range larger than +10° provides a youngest information, and the corresponding facial rejuvenation score index is 10 points, wherein in the 11 feature change value ranges, the feature change value range smaller than −10° provides an oldest information and the corresponding facial rejuvenation score index is 0 points, wherein in the 11 feature change value ranges, a sixth feature change value range is −1.11° to +1.11°, and the corresponding facial rejuvenation score index is 5 points.

4. The antiaging assessment method according to claim 1, wherein in the facial rejuvenation score index data table, the plural feature change value ranges include 11 feature change value ranges corresponding to the third facial feature angle, wherein in the 11 feature change value ranges, the feature change value range smaller than −10° provides a youngest information, and the corresponding facial rejuvenation score index is 10 points, wherein in the 11 feature change value ranges, the feature change value range larger than +10° provides an oldest information and the corresponding facial rejuvenation score index is 0 points, wherein in the 11 feature change value ranges, a sixth feature change value range is −1.11° to +1.11°, and the corresponding facial rejuvenation score index is 5 points.

5. The antiaging assessment method according to claim 1, wherein in the facial rejuvenation score index data table, the plural feature change value ranges include 11 feature change value ranges corresponding to the fourth facial feature angle, wherein in the 11 feature change value ranges, the feature change value range larger than +10° provides a youngest information, and the corresponding facial rejuvenation score index is 10 points, wherein in the 11 feature change value ranges, the feature change value range smaller than −10° provides an oldest information and the corresponding facial rejuvenation score index is 0 points, wherein in the 11 feature change value ranges, a sixth feature change value range is −1.11° to +1.11°, and the corresponding facial rejuvenation score index is 5 points.

6. The antiaging assessment method according to claim 1, wherein the plural facial key points further include an inferior eyebrow, a superior orbital edge, an upper eyelid, a lower eyelid, an iris, a left tragus, a right tragus and a chin tip, wherein the first facial feature length is a distance between the inferior eyebrow and the superior orbital edge, the second facial feature length is a distance between the superior orbital edge and the upper eyelid, the third facial feature length is a distance between the upper eyelid and the lower eyelid, the fourth facial feature length is a distance between the eyebrow peak and the iris, the fifth facial feature length is a sum of a length between the left tragus and the mouth corner and a length between the right tragus and the mouth corner, and the sixth facial feature length is a sum of a length between the left tragus and the chin tip and a length between the right tragus and the chin tip.

7. The antiaging assessment method according to claim 6, wherein in the facial rejuvenation score index data table, the plural feature change value ranges include 11 feature change value ranges corresponding to the first facial feature length, wherein in the 11 feature change value ranges, the feature change value range larger than +3 mm provides a youngest information, and the corresponding facial rejuvenation score index is 10 points, wherein in the 11 feature change value ranges, the feature change value range smaller than −3 mm provides an oldest information and the corresponding facial rejuvenation score index is 0 points, wherein in the 11 feature change value ranges, a sixth feature change value range is −0.33 mm to +0.33 mm, and the corresponding facial rejuvenation score index is 5 points.

8. The antiaging assessment method according to claim 6, wherein in the facial rejuvenation score index data table, the plural feature change value ranges include 11 feature change value ranges corresponding to the second facial feature length, wherein in the 11 feature change value ranges, the feature change value range smaller than −3 mm provides a youngest information, and the corresponding facial rejuvenation score index is 10 points, wherein in the 11 feature change value ranges, the feature change value range larger than +3 mm provides an oldest information and the corresponding facial rejuvenation score index is 0 points, wherein in the 11 feature change value ranges, a sixth feature change value range is −0.33 mm to +0.33 mm, and the corresponding facial rejuvenation score index is 5 points.

9. The antiaging assessment method according to claim 6, wherein in the facial rejuvenation score index data table, the plural feature change value ranges include 11 feature change value ranges corresponding to the third facial feature length, wherein in the 11 feature change value ranges, the feature change value range larger than +3 mm provides a youngest information, and the corresponding facial rejuvenation score index is 10 points, wherein in the 11 feature change value ranges, the feature change value range smaller than −3 mm provides an oldest information and the corresponding facial rejuvenation score index is 0 points, wherein in the 11 feature change value ranges, a sixth feature change value range is −0.33 mm to +0.33 mm, and the corresponding facial rejuvenation score index is 5 points.

10. The antiaging assessment method according to claim 6, wherein in the facial rejuvenation score index data table, the plural feature change value ranges include 11 feature change value ranges corresponding to the fourth facial feature length, wherein in the 11 feature change value ranges, the feature change value range smaller than −3 mm provides a youngest information, and the corresponding facial rejuvenation score index is 10 points, wherein in the 11 feature change value ranges, the feature change value range larger than +3 mm provides an oldest information and the corresponding facial rejuvenation score index is 0 points, wherein in the 11 feature change value ranges, a sixth feature change value range is −0.33 mm to +0.33 mm, and the corresponding facial rejuvenation score index is 5 points.

11. The antiaging assessment method according to claim 6, wherein in the facial rejuvenation score index data table, the plural feature change value ranges include 11 feature change value ranges corresponding to the fifth facial feature length, wherein in the 11 feature change value ranges, the feature change value range smaller than −10 mm provides a youngest information, and the corresponding facial rejuvenation score index is 10 points, wherein in the 11 feature change value ranges, the feature change value range larger than +10 mm provides an oldest information and the corresponding facial rejuvenation score index is 0 points, wherein in the 11 feature change value ranges, a sixth feature change value range is −1.11 mm to +1.11 mm, and the corresponding facial rejuvenation score index is 5 points.

12. The antiaging assessment method according to claim 6, wherein in the facial rejuvenation score index data table, the plural feature change value ranges include 11 feature change value ranges corresponding to the sixth facial feature length, wherein in the 11 feature change value ranges, the feature change value range smaller than −10 mm provides a youngest information, and the corresponding facial rejuvenation score index is 10 points, wherein in the 11 feature change value ranges, the feature change value range larger than +10 mm provides an oldest information and the corresponding facial rejuvenation score index is 0 points, wherein in the 11 feature change value ranges, a sixth feature change value range is −1.11 mm to +1.11 mm, and the corresponding facial rejuvenation score index is 5 points.

13. The antiaging assessment method according to claim 1, wherein the at least one reference feature is acquired before an aesthetic treatment is given to a patient and the at least one facial feature is acquired after the aesthetic treatment is given to the patient, or the at least one reference feature is acquired from a treatment course of the aesthetic treatment and the at least one facial feature is acquired from another treatment course of the aesthetic treatment, or the at least one reference feature is acquired from a historical facial image of the patient in the past and the at least one facial feature is acquired from the under-test facial image of the patient at present.

14. The antiaging assessment method according to claim 13, wherein after the step (d), the antiaging assessment method further comprises a step (e) of counting the at least one facial rejuvenation score index and calculating a facial antiaging assessment information.

15. The antiaging assessment method according to claim 14, wherein the at least one facial feature is acquired from the under-test facial image of the patient at present, the at least one reference feature is acquired from a big data analysis facial image after various facial images are subjected to the big data analysis, and the facial antiaging assessment information is a simulated facial antiaging assessment information, wherein the big data analysis facial image is acquired by using an artificial intelligence analysis and training method.

16. An antiaging assessment device for facial rejuvenation, the antiaging assessment device comprising:
a facial image input module comprising a facial image photographing unit and a positioning mechanism, wherein the facial image photographing unit acquires an under-test facial image, and the positioning mechanism stabilizes a head of a patient and positions the facial image photographing unit, so that the under-test facial image is acquired by the facial image photographing unit stably;
an artificial intelligence facial recognition module connected with the facial image input module, and comprising a facial key point detection unit and a facial feature description unit, wherein the artificial intelligence facial recognition module recognizes plural facial key points in the under-test facial image, so that plural facial features are obtained, wherein a spatial relationship between at least two facial key points of the plural facial key points is defined as at least one facial feature;
a facial feature reference database providing at least one reference feature;
a facial surface rejuvenation measurement unit connected with the artificial intelligence facial recognition module and the facial feature reference database, wherein after the facial surface rejuvenation measurement unit receives the at least one reference feature, the facial surface rejuvenation measurement unit performs a feature change comparison between the at least one reference feature and the at least one facial feature, so that at least one feature change value between the at least one reference feature and the at least one facial feature is obtained; and
a facial rejuvenation score index establishment and assessment unit connected with the facial surface rejuvenation measurement unit, and containing a facial rejuvenation score index data table, wherein the facial rejuvenation score index establishment and assessment unit acquires a corresponding facial rejuvenation score index from the facial rejuvenation score index data table according to the at least one feature change value, wherein in the facial rejuvenation score index data table, each of the at least one facial feature is related to plural feature change value ranges, and each of the plural feature change value ranges is related to the corresponding facial rejuvenation score index, wherein when a specified feature change value lies in a specified feature change value range of the plural feature change value ranges, the corresponding facial rejuvenation score index is obtained;

wherein the plural facial key points at least include a brow, a pupil, a nose wing, an eyebrow tail, an eyebrow peak, an outer canthus, a mouth corner, an inferior eyebrow, a superior orbital edge, an upper eyelid, a lower eyelid, an iris, a left tragus, a right tragus and a chin tip, and wherein the at least one facial feature defined by the facial key points includes at least one facial feature angle or at least one facial feature length, wherein the at least one facial feature angle includes a first facial feature angle, a second facial feature angle, a third facial feature angle and a fourth facial feature angle, and the at least one facial feature length includes a first facial feature length, a second facial feature length, a third facial feature length, a fourth facial feature length, a fifth facial feature length and a sixth facial feature length;

wherein the first facial feature angle is defined by a line from the eyebrow peak to the brow and a horizontal line extending from the brow, the second facial feature angle is defined by a line from the eyebrow tail to the brow and the horizontal line extending from the brow, the third facial feature angle is defined by a line from an outer side of the pupil to the nose wing and a line from the nose wing to the eyebrow peak, and the fourth facial feature angle is defined by a line passing through the nose wing and the mouth corner and a line passing through the mouth corner and the outer canthus.

17. The antiaging assessment device according to claim 16, further comprising an output unit, wherein the output unit is connected with the facial surface rejuvenation measurement unit and the facial rejuvenation score index establishment and assessment unit, and the at least one facial feature and the corresponding facial rejuvenation score index are outputted from the output unit, wherein after plural facial rejuvenation score indexes are accumulated and counted by the facial rejuvenation score index establishment and assessment unit, a facial antiaging assessment information is obtained, and the facial antiaging assessment information is transmitted to the output unit.

18. The antiaging assessment device according to claim 17, further comprising:

a facial surface simulation unit connected with the artificial intelligence facial recognition module and the facial feature reference database, wherein after a big data analysis facial feature is inputted into the facial surface simulation unit, the at least one reference feature is obtained, and another feature change comparison between the at least one reference feature and the at least one facial feature is performed, so that a simulated feature change value between the at least one reference feature and the at least one facial feature is obtained, wherein the facial rejuvenation score index establishment and assessment unit acquires the corresponding facial rejuvenation score index from the facial rejuvenation score index data table according to the simulated feature change value, wherein after plural facial rejuvenation score indexes are accumulated and counted by the facial rejuvenation score index establishment and assessment unit, a simulated facial antiaging assessment information is obtained;

an aesthetic treatment plan suggestion unit connected with the facial rejuvenation score index establishment and assessment unit and the output unit, wherein the aesthetic treatment plan suggestion unit provides a aesthetic treatment plan suggestion information to the output unit according to the facial antiaging assessment information and the simulated facial antiaging assessment information; and an artificial intelligence analysis and training module connected with the facial rejuvenation score index establishment and assessment unit, the aesthetic treatment plan suggestion unit and the output unit, wherein the artificial intelligence analysis and training module performs an artificial intelligence analysis and training process according to at least one of the facial antiaging assessment information, the simulated facial antiaging assessment information and the aesthetic treatment plan suggestion information.

* * * * *